US012706924B2

(12) United States Patent
Potekhin et al.

(10) Patent No.: US 12,706,924 B2
(45) Date of Patent: Aug. 11, 2026

(54) TECHNIQUES FOR DETECTING PERSISTENT DIGITAL ASSETS ON AN EXTERNAL ATTACK SURFACE

(71) Applicant: Cycognito, Ltd., Tel Aviv (IL)

(72) Inventors: Dima Potekhin, Tel Aviv (IL); Amit Amar, Tel Aviv (IL); Rob N Gurzeev, Palo Alto, CA (US)

(73) Assignee: Cycognito, Ltd., Tel Aviv (IL)

( * ) Notice: Subject to any disclaimer, the term of this patent is extended or adjusted under 35 U.S.C. 154(b) by 200 days.

(21) Appl. No.: 18/507,798

(22) Filed: Nov. 13, 2023

(65) Prior Publication Data

US 2025/0159003 A1 May 15, 2025

(51) Int. Cl.
*G06F 21/00* (2013.01)
*H04L 9/40* (2022.01)

(52) U.S. Cl.
CPC ...... *H04L 63/1416* (2013.01); *H04L 63/1425* (2013.01)

(58) Field of Classification Search
CPC .. H04L 63/1416; H04L 63/1425; H04L 63/10
See application file for complete search history.

(56) References Cited

U.S. PATENT DOCUMENTS 11,468,048 B2 * 10/2022 Yan ..................... G06F 16/2379
12,212,681 B1 * 1/2025 Drapeau .............. G06Q 20/085
2010/0106742 A1 * 4/2010 Guruswamy ........... H04L 41/12 707/E17.014
2011/0106826 A1 * 5/2011 Swanbeck .............. G06F 21/10 707/E17.014
2013/0145153 A1 * 6/2013 Brown ................ H04L 63/0823 713/156
2017/0237747 A1 * 8/2017 Quinn ................... G06F 21/602 726/29
2021/0099477 A1 * 4/2021 Hunt ................... H04L 63/1433
2022/0014546 A1 * 1/2022 Kiernan .............. H04L 63/1416
2022/0269776 A1 * 8/2022 Nalluri .................. G06F 21/577

* cited by examiner

*Primary Examiner* — Michael M Lee
(74) *Attorney, Agent, or Firm* — M&B IP Analysts, LLC

(57) ABSTRACT

A system and method for detecting persistent digital assets in an attack surface of a networked computing environment is disclosed. The method includes: continuously detecting digital asset information from a networked computing environment; updating a representation of a digital asset in response to determining that the digital asset information corresponds to a previously detected digital asset; and generating a representation of a digital asset in response to determining that the digital asset information corresponds to a new digital asset.

19 Claims, 5 Drawing Sheets

TECHNIQUES FOR DETECTING PERSISTENT DIGITAL ASSETS ON AN EXTERNAL ATTACK SURFACE

TECHNICAL FIELD

The present disclosure relates generally to external attack surface management and specifically to detecting persistent digital assets in a networked computing environment.

BACKGROUND

As organizations, such as businesses, governments, and the like, expand the implementation of computer systems to improve operations, such organizations may include, within the organizations' computing systems, various cloud services and platforms, such as those provided by, or included in, Microsoft® Azure, Amazon® Web Service (AWS), and the like. Such cloud services and platforms, including services, applications, platforms, and the like, may include various sub-devices, sub-systems, and the like, where the various included devices and systems, which may be interconnected, including via multi-cloud connections, cross-cloud connections, and the like, may be configured to provide various functionalities, to simulate or emulate various physical systems and devices, and the like. The systems and devices which make up an organization's computing ecosystem may include various vulnerabilities, exposures, misconfigurations, and similar cybersecurity threats, where such threats may present security risks to an organization.

Threat actors seeking to capitalize on the rapid growth and constant change inherent in these large organizational cloud services and platforms will often attempt to scan the publicly facing internet for publicly available attack vectors; points of entry wherein a threat actor can attempt to compromise a secured network through intrusion into the network using an exposed entry point on a publicly available enterprise resource, such as a customer facing website, third-party service integrated into the enterprise network, inadvertently exposed internal resource (including a device or devices, sub-device or sub-devices, sub-system or subsystems), and the like.

Threat actors who find a potential vulnerability will often utilize known compromise techniques, such as port-scanning, remote desktop protocol "probing", remote code execution (RCE) vulnerability exploitations, and the like, to test the potential efficacy of various exploitation methods of the network.

Once an attacker discovers a viable point of entry into the organizational network, they will often utilize the initially compromised asset as a launch-point from which further attempts to compromise what would otherwise be internal network assets will be executed. This in turn often leads to the discovery of other vulnerabilities, particularly vulnerable assets on the network, which in turn allows the threat actor to potentially compromise the network further through "spinning-up" (creating/provisioning) their own malicious network assets outside of the knowledge of the organization's security team, allowing these assets to reap the benefits of being behind the organization's firewall.

A threat actor may also utilize compromised internal network assets to further compromise outside third-party organizations who may have a higher degree of trust for incoming connections from the compromised network, thereby perpetuating the attack and allowing the threat actor to exponentially multiply their exploitation.

External Attack Surface Management (EASM) is a "good cybersecurity hygiene" practice wherein an organization's security team will develop a map of devices comprising the organization's computing ecosystem in order to manage organizational risk, stay up to date with security updates, enable good practice cybersecurity measures (e.g.: penetration testing, vulnerability patching, and the like), and facilitate minimization of attack vectors (e.g.: by decommissioning obsolete devices to minimize the attack surface).

Following development of this organizational network map, an organization's security team will then seek to identify and classify network assets in order to develop vulnerability profiles and risk appetites. This identification and classification of assets serves a further purpose in development of risk management plans, remediation strategies in the event of a compromise, risk profiles, and the like.

Furthermore, all these operations would need to be performed for each cloud computing environment (i.e., for Azure®, for AWS, etc.) and as such would dramatically increase the complexity of performing such actions.

As an organization's computing ecosystem may be large, complex, or otherwise difficult to manually analyze, such organizations may seek solutions providing automated analysis of connected devices, systems, platforms, environments, and the like, for EASM purposes. Such solutions, such as those currently available, may provide for the identification of computing devices and components, the identification of connections between such devices and components, and the like. Further, certain currently-available solutions may also provide for the execution of various security processes, such as scanning processes, across such networks, platforms, and environments. Additionally, certain currently-available solutions may also provide for the analysis, classification, and provision of suggested remediation solutions for certain detected cybersecurity threats.

Currently-available solutions require consistent, timely scanning in order to detect new devices within the organizational network. These currently-available solutions are required to run complete re-scans of the organizational network, due to their automated nature, to ensure that all connected assets are correctly identified and analyzed. This can be an expensive operation in terms of cost, time, or effort, as the nature of large cloud-based organizational networks, and the current climate of bring your own device acceptance for individuals who work from home, means that the network asset profile can change exponentially and by the minute. In order to stay completely up to date, currently-available solutions conceivably need to be scanning and rebuilding external attack surface maps constantly.

Furthermore, currently-available solutions differ in how they detect and analyze assets on an organizational network. Some may not discover certain classes of assets (e.g.: "Shadow IT" a.k.a. unauthorized assets not known to organizational security teams), some may fail to properly provide remediation suggestions, some may incorrectly describe the risk associated with a particular asset (e.g.: failing to properly capture the "blast radius" of an asset should it become compromised), and the like.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include continuously detecting digital asset information from a networked computing environment. Method may also include updating a representation of a digital asset in response to determining that the digital asset information corresponds to a previously detected digital asset. Method may furthermore include generating a representation of a digital asset in response to determining that the digital asset information corresponds to a new digital asset. Other embodiments of this aspect include corresponding computer systems, apparatus, and computer programs recorded on one or more computer storage devices, each configured to perform the actions of the methods.

Implementations may include one or more of the following features. Method may include: detecting a hash of a digital certificate in the digital asset information; and determining that the digital asset information corresponds to a previously detected digital asset in response to determining that the detected hash matches a stored hash of the previously detected digital asset. Method may include: detecting a plurality of attribute values in the digital asset information; and determining that the digital asset information corresponds to a previously detected digital asset in response to determining that a portion of the plurality of attribute values match a stored portion of values of the previously detected digital asset. Method may include: determining that an attribute value is a validated value in response to detecting the attribute value a number of instances which exceed a predetermined threshold; and determining that the attribute value is an unvalidated value in response to detecting the number of instances less than the predetermined threshold. Method may include: determining statistical distribution of the attribute value; and determining that the digital asset information corresponds to a previously detected digital asset in response to determining that an attribute value is an infrequent value based on the determined statistical distribution. Method may include: evicting a representation of a digital asset, in response to determining that the digital asset information does not include attribute values matching stored attribute values of the digital asset. Method may include: generating the representation of the digital asset based on the detected digital asset information. Method where the detected digital asset information includes any one of: a network address, a subnet, an IP range, a communication port, a domain name, an operating system version, a hash of a certificate, an application version, a name from a namespace, an UUID, a MAC address, a known device identifier, a content, a website, a file, a filename, a network protocol banner, remote desktop address, a login page, and any combination thereof. Method may include: detecting a change in a domain name service (DNS) record associated with the networked computing environment; and replacing a stored network address in the representation of the digital asset with a network address corresponding to the changed DNS record. Method where the digital asset is any one of: a virtual machine, a software container, a serverless function, a personal computing device, an IoT device, a physical computing device, a firewall, a hypervisor, a load balancer, a container, a pod, a database system, and any combination thereof. Method may include: receiving an identifier of an organization; detecting in a DNS record a plurality of network addresses, where the DNS record is associated with the organization; sending a network protocol message to a destination based on a network address of the plurality of network addresses; and receiving a reply to the network protocol message as part of the digital asset information. Implementations of the described techniques may include hardware, a method or process, or a computer tangible medium.

In one general aspect, non-transitory computer-readable medium may include one or more instructions that, when executed by one or more processors of a device, cause the device to: continuously detect digital asset information from a networked computing environment. Medium may furthermore update a representation of a digital asset in response to determining that the digital asset information corresponds to a previously detected digital asset. Medium may in addition generate a representation of a digital asset in response to determining that the digital asset information corresponds to a new digital asset. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: continuously detect digital asset information from a networked computing environment. System may in addition update a representation of a digital asset in response to determining that the digital asset information corresponds to a previously detected digital asset. System may moreover generate a representation of a digital asset in response to determining that the digital asset information corresponds to a new digital asset. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: detect a hash of a digital certificate in the digital asset information; and determine that the digital asset information corresponds to a previously detected digital asset in response to determining that the detected hash matches a stored hash of the previously detected digital asset. System where the memory contains further instructions which when executed by the processing circuitry further configure the system to: detect a plurality of attribute values in the digital asset information; and determine that the digital asset information corresponds to a previously detected digital asset in response to determining that a portion of the plurality of attribute values match a stored portion of values of the previously detected digital asset. System where the memory contains further instructions which when executed by the processing circuitry further configure the system to: determine that an attribute value is a validated value in response to detecting the attribute value a number of instances which exceed a predetermined threshold; and determine that the attribute value is an unvalidated value in response to detecting the number of instances less than the predetermined threshold. System where the memory contains further instructions which when executed by the processing circuitry further configure the system to: determine statistical distribution of the attribute value; and determine that the digital asset information corresponds to a previously detected digital asset in response to determining that an attribute value is an infrequent value based on the determined statistical distribution. System where the memory contains further instructions which when executed by the processing circuitry further configure the system to: evict a representation of a digital asset, in response to determining that the digital asset information does not include attribute values matching stored attribute values of the digital asset. System where the memory contains further instructions which when executed by the processing circuitry further configure the system to: generate the representation of the digital asset based on the detected digital asset information. System where the detected digital asset information includes any one of: a network address, a subnet, an IP range, a communication port, a domain name, an operating system version, a hash of a certificate, an application version, a name from a namespace, an UUID, a MAC address, a known device identifier, a content, a website, a file, a filename, a network protocol banner, remote desktop address, a login page, and any combination thereof. System where the memory contains further instructions which when executed by the processing circuitry further configure the system to: detect a change in a domain name service (DNS) record associated with the networked computing environment; and replace a stored network address in the representation of the digital asset with a network address corresponding to the changed DNS record. System where the digital asset is any one of: a virtual machine, a software container, a serverless function, a personal computing device, an IoT device, a physical computing device, a firewall, a hypervisor, a load balancer, a container, a pod, a database system, and any combination thereof. System where the memory contains further instructions which when executed by the processing circuitry further configure the system to: receive an identifier of an organization; detect in a DNS record a plurality of network addresses, where the DNS record is associated with the organization; send a network protocol message to a destination based on a network address of the plurality of network addresses; and receive a reply to the network protocol message as part of the digital asset information. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
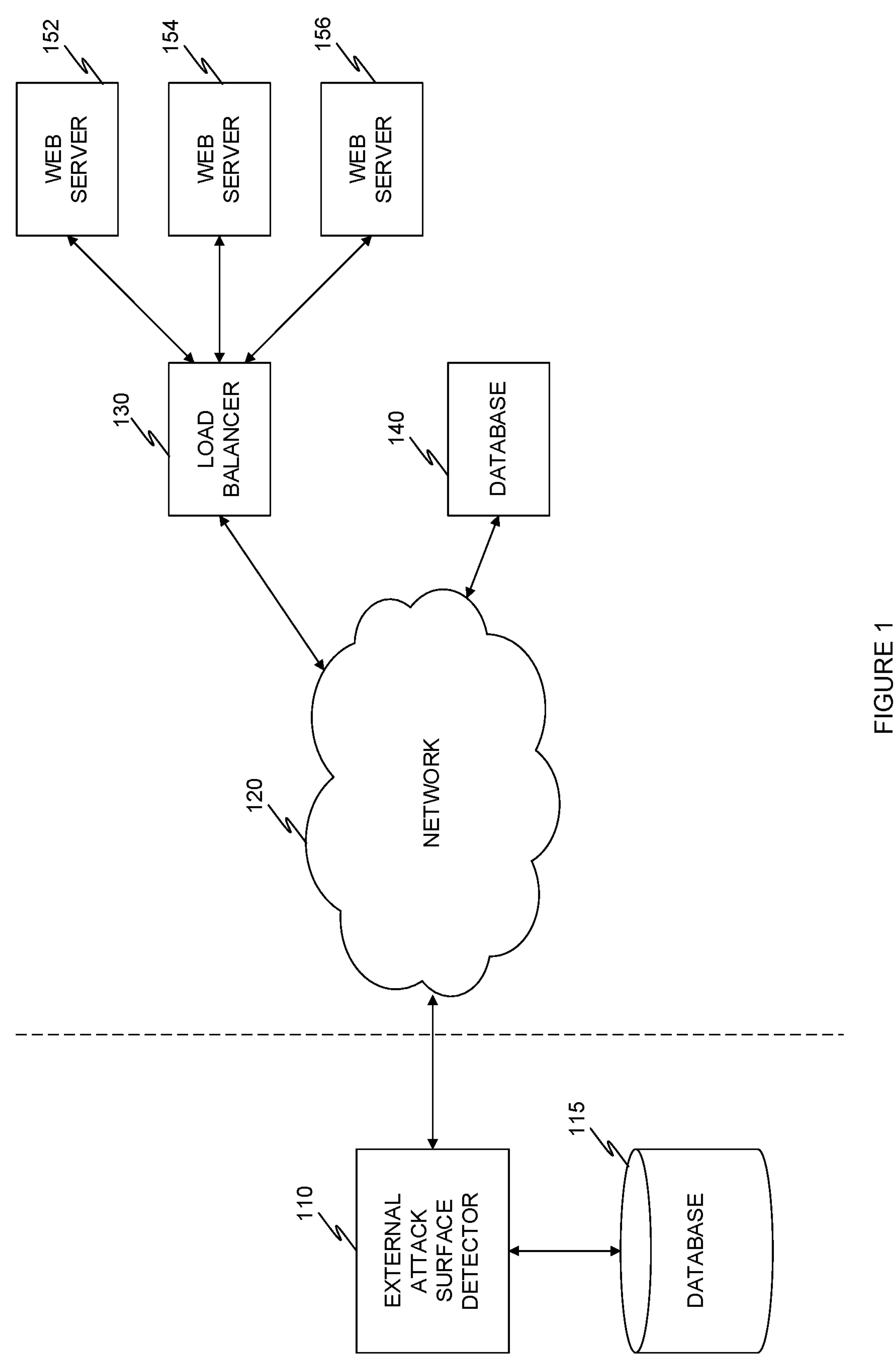
FIG. 1 is a network diagram of a computing environment having persistent digital assets discovered by an external attack surface detector, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to an embodiment, a system is configured to detect persistent digital assets through an external attack surface. In an embodiment, detecting a persistent digital asset is beneficial, as having an accurate view of an external attack surface is beneficial, for example for cybersecurity mitigation, remediation, and the like.

In some embodiments, a representation of a digital asset is generated based on information detected through a public network, such as the Internet. In an embodiment, information pertaining to a digital asset changes over time. For example, a digital asset has a first state at a first point of time, and a second state at a second point in time. In an embodiment, a state includes an IP address, an operating system, a viable network communication port, combinations thereof, and the like, as explained in more detail with respect to embodiments herein.

In an embodiment, it is beneficial to detect persistent digital assets, despite changes such as software updates, IP address changes, domain name changes, and the like, which occur over time.

FIG. 1 is a network diagram of a computing environment having persistent digital assets discovered by an external attack surface detector, utilized to describe an embodiment. A network computing environment, according to an embodiment, includes virtual digital assets, physical digital assets, combinations thereof, and the like. In an embodiment, a virtual digital asset is a virtual machine, a software container, a serverless function, a virtual appliance, an application image, a web server, a load balancer, a database, a distributed storage service, a combination thereof, and the like.

In some embodiments, a physical digital asset is a bare metal machine, a server rack, a processor, a memory, a storage, combinations thereof, and the like.

In an embodiment, a computing environment includes a load balancer 130, which exposes web servers, such as a first web server 152, a second web server 154, and a third web server 156. In some embodiments, the computing environment includes a database 140. In certain embodiments, the computing environment, elements thereof, and the like, are connected to a network 120.

In some embodiments, the network 120 includes, but is not limited to, a wireless, cellular or wired network, a local area network (LAN), a wide area network (WAN), a metro area network (MAN), the Internet, the worldwide web (WWW), similar networks, and any combination thereof.

According to an embodiment, a computing environment includes an external attack surface. An external attack surface includes, in an embodiment, machines, devices, digital assets, physical assets, and the like, which are exposed through a network 120, an external network (i.e., a network which is external to a network of the computing environment), a public network, combinations thereof, and the like.

For example, in an embodiment, a load balancer 130 is part of a computing environment's external attack surface, as the load balancer 130 is exposed to a network which includes network elements that are not part of the computing environment. For example, a load balancer 130 that is exposed to the Internet is part of an attack surface, according to an embodiment. Gaining access through an external attack surface is a common way attackers gain access to network computing environments. It is therefore advantageous to detect an organization's external attack surface, so that cybersecurity measures can be put in place, including deterring attackers, remediate attacks, mitigate attacks, and the like.

In certain embodiments, an external attack surface detector 110 is configured to detect a computing environment's external attack surface. In some embodiments, a computing environment is a cloud computing environment, a networked computing environment, a hybrid computing environment, a combination thereof, and the like.

In some embodiments, a cloud computing environment is a virtual private cloud (VPC), a virtual network (VNet), and the like. In certain embodiments, a cloud computing environment is deployed on a cloud computing infrastructure, such as Amazon® Web Services (AWS), Google® Cloud Platform (GCP), Microsoft® Azure®, and the like.

In an embodiment, an external attack surface detector 110 is configured to detect the computing environment's external attack surface, based on an identifier of an organization. For example, according to an embodiment, a detector 110 is configured to detect a domain name service (DNS) record based on the organization identifier. In an embodiment, a DNS record is detected by querying a DNS server with the organization identifier. An organization identifier is, for example, a legal entity name, a subsidiary name, a tax ID number, a company ID number, a combination thereof, and the like.

In certain embodiments, a DNS query returns a response including a plurality of network addresses. For example, according to an embodiment, a DNS query response includes a static IP address, a dynamic IP address, a combination thereof, and the like.

In an embodiment, a network protocol message is generated based on a network address detected in the DNS query response. For example, in an embodiment, a network protocol message includes generating a PING command to an IP address, a range of IP addresses, and the like, and receive a response to the network protocol message.

In certain embodiments, the network protocol is TCP/IP, UDP, HTTP, SSH, a combination thereof, and the like. In some embodiments, the network protocol message is delivered over a unique port, a plurality of unique ports, and the like. For example, in an embodiment, an HTTP message is generated, and the same message is transmitted over port 80 and port 8080 to the same IP address.

According to an embodiment, a reply is received in response to sending the network protocol message. For example, in an embodiment, an HTTP response includes a code, such as 404, 503, etc. In certain embodiments, a detector 110 is configured to generate a representation of a digital asset based on a predefined data schema, and store such a representation in a database 115. For example, in an embodiment, the detector 110 is configured to generate a representation of a digital asset based on digital asset information.

In an embodiment, digital asset information includes a network address, a network address range, a domain identifier, a sub-domain name, a namespace identifier, a MAC address, an operating system identifier, an application version, an application identifier, a certificate, a hash of a certificate, a checksum result, a web application, an HTML code, a combination thereof, and the like.

In an embodiment, the detector 110 is configured to extract a value from digital asset information, and store the extracted value in a representation of the digital asset, for example in the database 115. Digital assets are often not static across time, which presents a challenge in identifying persistent digital assets. As a simple example, a digital asset has a first IP address at a first time, and a second IP address at a second time. This can occur, for example, due to a change in a static IP of a domain. In an embodiment, such a change is detected based on a DNS record.

In certain embodiments, the detector 110 is configured to detect when digital asset information applies to an existing digital asset (e.g., a change of IP address), or when digital asset information applies to a new digital asset. In some embodiments the detector 110 is configured to apply a policy, a rule, a conditional rule, a heuristic, a combination thereof, and the like, to determine if digital asset information is applied to a new digital asset or a previously detected digital asset.

In some embodiments, a digital asset representation includes a plurality of attributes, each attribute having a corresponding value. For example, in an embodiment, the detector 110 is configured to detect, extract, and the like, a value from digital asset information, and store such an extracted value in the digital asset representation of the digital asset.

In some embodiments, the detector is configured to determine if a digital asset information applies to a new digital asset or a previously detected digital asset based on a threshold. For example, in an embodiment, an attribute includes a threshold, a change threshold, and the like. In certain embodiments, where an attribute value changes at a frequency which exceeds the threshold, the digital asset information is determined to be of a new digital asset.

In certain embodiments, the threshold is applied to a number of attributes changing together. For example, where digital asset information includes the same IP address with a different port, for the same protocol, the detector 110 is configured to determine that the digital asset is the previously detected digital asset (i.e., only one attribute changed). In an embodiment, where the digital asset information includes a different IP address, a different port, and the same protocol, the detector 110 is configured to determine that the digital asset information applies to a new digital asset.

In some embodiments, certain changes are disregarded in determining if the digital asset is a previously detected digital asset or not. For example, where a DNS record indicates that a domain changed an IP address, then each digital asset associated with the domain has likely changed IP address as well, and therefore the digital asset information pertaining to that digital asset is determined based on other factors, attributes, and the like, which are not the IP address.

Figure 2:
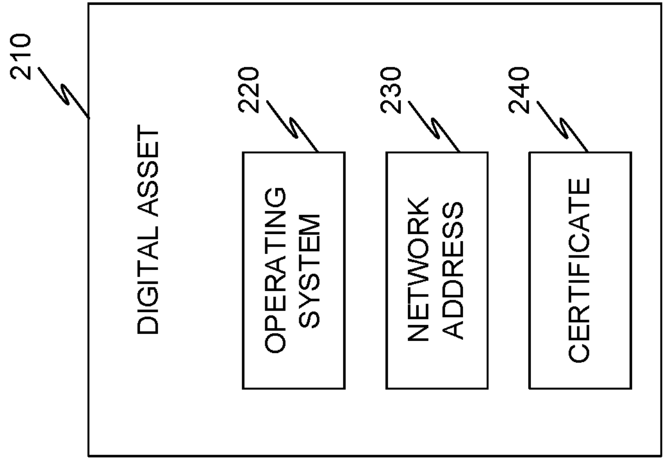
FIG. 2 is a diagram of an external attack surface detector and a digital asset, utilized to describe an embodiment.
Figure 2:
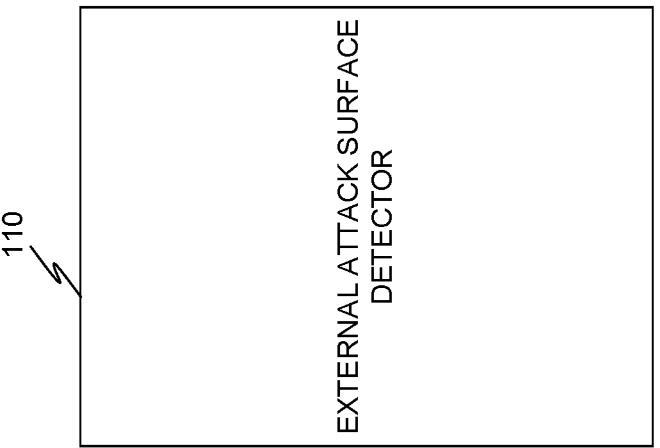

FIG. 2 is a diagram of an external attack surface detector and a digital asset, utilized to describe an embodiment.

An example of a detector 110 is described in more detail herein. In an embodiment, a detector 110 is implemented as a virtual machine, a software container, a serverless function, a combination thereof, and the like.

In an embodiment, an external attack surface detector 110 is configured to detect a digital asset 210. In an embodiment, the digital asset 210 is deployed in a networked computing environment. In some embodiments, a digital asset 210 consists of attributes, such as an operating system 220, a network address 230, a certificate 240, a combination thereof, and the like.

For example, a digital asset's 210 operating system 220 can be Microsoft Windows, MacOS, a flavor of Linux, a UNIX based operating system, a proprietary OS, or the like.

For example, in an embodiment, a digital asset's 210 network address 230, can refer to an external IP address, an internal IP address, a machine-specific address, a combination thereof, and the like.

In some embodiments, a digital asset's 210 certificate 240, can refer to a PKI security certificate, or the like.

In certain embodiments, attributes of a digital asset 210 can change over time, thereby presenting a challenge. For example, in an embodiment, an operating system 220 is a first version (e.g., Windows® 10) at a first point in time, and a second version (e.g., Windows® 11) at a second point in time which is later than the first point. A detector 110 is configured to apply a rule, a policy, a condition, a heuristic, a combination thereof, and the like, to determine if a digital asset is a previously detected digital asset, or a new digital asset.

In some embodiments, the detector 110 is configured to generate a fingerprint for each digital asst. In certain embodiments, a fingerprint is a static collection of data pertaining to the digital asset (e.g., static values of attributes). In certain embodiments, the detector 110 is configured to determine if a digital asset is a previously detected digital asset or a new digital asset based on a fingerprint, or based on a portion of a fingerprint.

For example, in an embodiment, the detector 110 is configured to determine that a digital asset which has the same network address 230, same digital certificate 240, and a different operating system 220 is a previously detected digital asset, if the current operating system is of the same type (e.g., Windows, Linux, etc.) as the previously detected operating system.

As another example, in an embodiment, the detector 110 is configured to determine that a digital asset which has the same network address 230, the same digital certificate 240, and a different operating system 220 is a newly detected digital asset, where the current operating system (e.g., Windows) is of a different type as the previously detected operating system (e.g., Linux).

Figure 3:
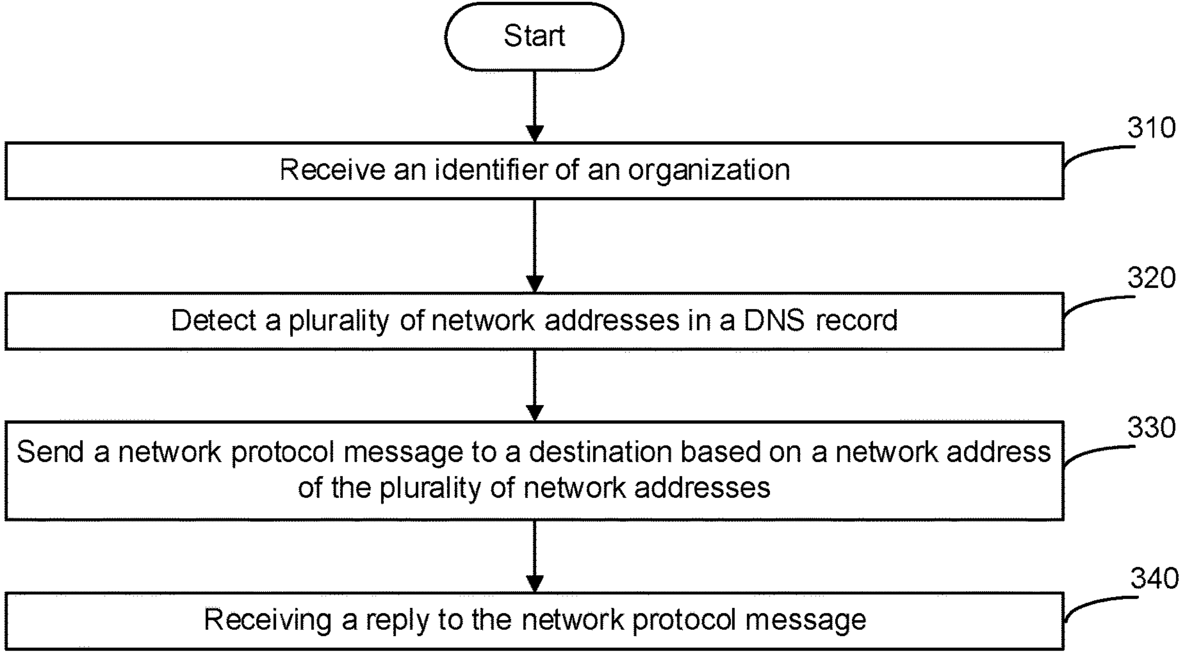
FIG. 3 is a flowchart of a method for detecting a digital asset in a networked computing environment, implemented in accordance with an embodiment.

FIG. 3 is a flowchart of a method for detecting a digital asset in a networked computing environment, implemented in accordance with an embodiment.

At S310, an organization identifier is received. The organization identifier identifies the domain wherein scanning of digital assets should commence, according to an embodiment. An organization identifier is, for example, a legal entity name, a subsidiary name, a tax ID number, a company ID number, a combination thereof, and the like, in certain embodiments.

In an embodiment, the organization identifier is utilized in the configuration of an external attack surface detector. The external attack surface detector is configured to detect assets across a plurality of network addresses received in a DNS record, the record being the result of the DNS query for the domain identified by the organization identifier.

At S320, a plurality of network addresses is detected. In an embodiment, a network address corresponds to a DNS record located using the organization identifier. For example, in an embodiment, the DNS record is provided at S310.

In an embodiment, location of a domain associated with the DNS using the organization identifier can be achieved through Open-source Intelligence (OSINT) resources, publicly available lists of registered domains within popular domain registries (e.g., GoDaddy.com), utilizing a DNS lookup protocol (e.g., WHOIS) to query and retrieve information about a particular domain, a combination thereof, and the like.

In an embodiment, a DNS record is detected by querying a DNS server with the organization identifier. An organization identifier is, for example, a legal entity name, a subsidiary name, a tax ID number, a company ID number, a combination thereof, and the like.

In certain embodiments, a DNS query returns a response including a plurality of network addresses. For example, according to an embodiment, a DNS query response includes a static IP address, a dynamic IP address, a combination thereof, and the like.

At S330, a network protocol message is sent. In an embodiment, the network protocol message is sent to a destination, wherein the destination is based on a network address of the plurality of network addresses.

In an embodiment, a network protocol message is generated based on a network address detected in the DNS query response. For example, in an embodiment, a network protocol message includes generating a PING command to an IP address, a range of IP addresses, and the like, and receiving a response to the network protocol message.

In certain embodiments, the network protocol is TCP/IP, UDP, HTTP, SSH, a combination thereof, and the like. In some embodiments, the network protocol message is delivered over a unique port, a plurality of unique ports, and the like. For example, in an embodiment, an HTTP message is generated, and the same message is transmitted over port 80 and port 8080 to the same IP address.

In some embodiments, a message may be sent to a destination which yields no reply. The reasons for this can include: the destination refusing to accept messages at the sent location, the destination refusing to accept messages utilizing the selected communication protocol, the destination refusing to accept messages completely, the destination being a "dead" resource at the detected location, a combination thereof, and the like.

At S340, a reply is received. In an embodiment, the reply is received in response to a previously sent network protocol message. For example, in an embodiment, an HTTP response includes a code, such as 404, 503, etc. The protocol used to receive the reply must match the protocol used to send the message.

In certain embodiments, receiving a reply indicates that the asset is a component of the external attack surface. For example, if the asset provides a reply using a public communication protocol, such as HTTP, over a publicly accessible communication port, such as port 80, without requiring any authentication or authorization on behalf of the sender, the asset will be deemed to be part of the external attack surface.

In some embodiments, a reply is received using a protocol which expects some sort of credentials to be presented with the initial request. For example, according to an embodiment, a request may require that the requesting party provide authentication or security information (e.g.: a public key address, encrypted credentials, or the like). The asset may provide a reply which is not indicative of a security vulnerability, such as a HTTP code 401 indicating that the client sending the request is unknown to the asset. In these embodiments, the presence of a reply does not qualify the asset as being compromised, but can indicate that the asset is part of the external attack surface.

Figure 4:
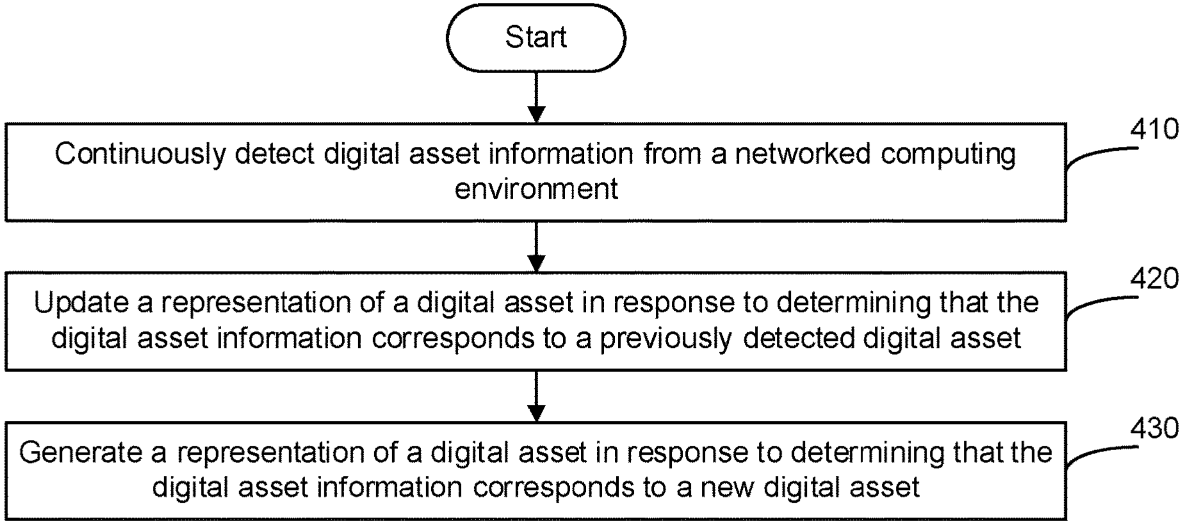
FIG. 4 is a flowchart of a method for detecting persistent digital assets in a networked computing environment, implemented according to an embodiment.

FIG. 4 is a flowchart of a method for detecting persistent digital assets in a networked computing environment, implemented according to an embodiment.

At S410, a persistent digital asset is detected. In an embodiment, a networked computing environment is continuously scanned for digital assets. In some embodiments, the network computing environment is scanned for digital assets at a predefined time, a predefined time interval, a combination thereof, and the like.

A network computing environment, according to an embodiment, includes virtual digital assets, physical digital assets, combinations thereof, and the like. In an embodiment, a virtual digital asset is a virtual machine, a software container, a serverless function, a virtual appliance, an application image, a web server, a load balancer, a database, a distributed storage service, a combination thereof, and the like.

In some embodiments, a physical digital asset is a bare metal machine, a server rack, a processor, a memory, a storage, combinations thereof, and the like.

In an embodiment, digital asset information includes a network address, a port, network address range, a domain identifier, a sub-domain name, a namespace identifier, a MAC address, an operating system identifier, an application version, an application identifier, a certificate, a hash of a certificate, a checksum result, a web application, an HTML code, a combination thereof, and the like.

In an embodiment, detecting digital assets in the networked computing environment is performed by an external attack surface detector, such as described in more detail herein.

In an embodiment, the detector (i.e., the external attack surface detector) is configured to extract a value from digital asset information, and store the extracted value in a representation of the digital asset, for example in a database.

Digital assets are often not static across time, which presents a challenge in identifying persistent digital assets. As a simple example, a digital asset has a first IP address at a first time, and a second IP address at a second time. This can occur, for example, due to a change in a static IP of a domain. In an embodiment, such a change is detected based on a DNS record.

In certain embodiments, the detector is configured to detect when digital asset information applies to an existing digital asset (e.g., a change of IP address), or when digital asset information applies to a new digital asset. In some embodiments the detector is configured to apply a policy, a rule, a conditional rule, a heuristic, a combination thereof, and the like, to determine if digital asset information is applied to a new digital asset or a previously detected digital asset.

In some embodiments, a digital asset representation includes a plurality of attributes, each attribute having a corresponding value. For example, in an embodiment, the detector is configured to detect, extract, and the like, a value from digital asset information, and store such an extracted value in the digital asset representation of the digital asset.

In some embodiments, the detector is configured to determine if a digital asset information applies to a new digital asset or a previously detected digital asset based on a threshold. For example, in an embodiment, an attribute includes a threshold, a change threshold, and the like. In certain embodiments, where an attribute value changes at a frequency which exceeds the threshold, the digital asset information is determined to be of a new digital asset.

In certain embodiments, a statistical distribution is determined for values of an attribute, a plurality of attributes, and the like. For example, according to an embodiment, a statistical distribution is determined for values of a communication port (e.g., 80, 20, 22, etc.). In an embodiment, port 5190 is determined to be an infrequent port, i.e., a communication port which is used infrequently, appears infrequently, and the like, for example based on a determined statistical distribution of port values.

In some embodiments, an infrequent value is an indicator of a persistent digital asset. For example, a first digital asset is detected with a first IP address, having an infrequent value for a communication port. At a second time, a second digital asset is detected with a second IP address, having the infrequent value for a communication port. In some embodiments, it is determined that the second digital asset is the first digital asset, due to a probability that the infrequent port value is below a threshold.

At S420, an existing digital asset representation of an existing digital asset is updated. In an embodiment, updating an existing digital asset representation is performed in response to an external attack surface detector determining that the digital asset information corresponds to a previously detected digital asset.

At S430, a new digital asset representation of a digital asset is generated. In an embodiment, the new digital asset representation is generated in response to an inspector determining that the digital asset information should apply to a new digital asset.

Generating a new digital asset includes, according to an embodiment: creating a new entry in a security database representative of the new digital asset. The representation of the new digital asset (as described, for example, in 210) includes information such as the detected asset's operating system 220, the network address 230 of the asset, known and discoverable asset certificate information 240, any other asset identifier information known to, or discoverable by, the detector at the moment of entry creation, a combination thereof, and the like.

According to an embodiment, a new digital asset is one wherein previously known asset identifiers do not yield a suitable match, as determined by the inspector, following a query of the digital asset representation database.

Figure 5:
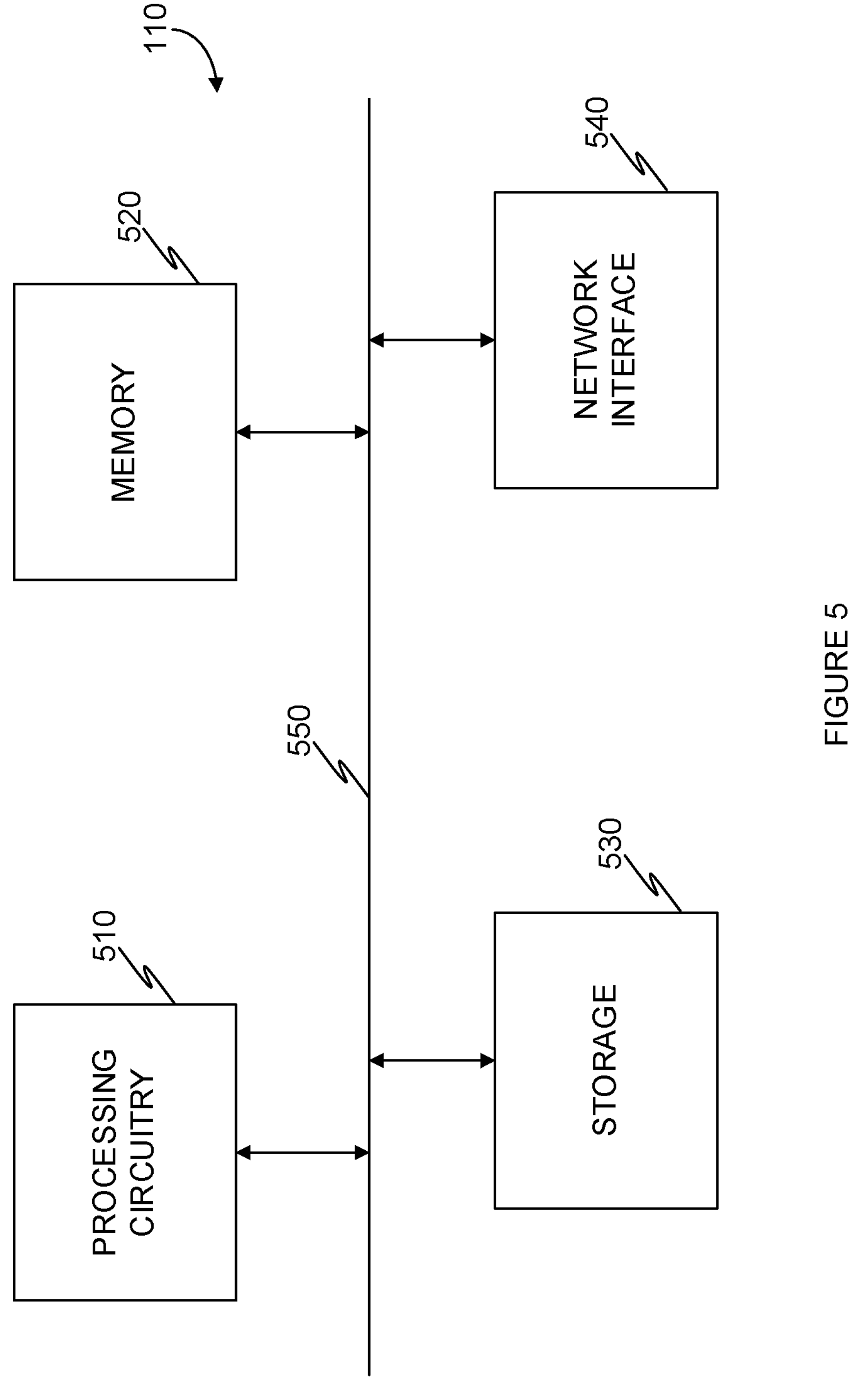
FIG. 5 is an example schematic diagram of a detector according to an embodiment.

FIG. 5 is an example schematic diagram of a detector 110 according to an embodiment. The detector 110 includes a processing circuitry 510 coupled to a memory 520, a storage 530, and a network interface 540. In an embodiment, the components of the detector 110 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the detector 110 with communication with, for example, the computing environment described in more detail in FIG. 1, specifically the database 115, the database 140, the load balancer 130, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting persistent digital assets in an attack surface of a networked computing environment, comprising:

continuously detecting digital asset information over a network interface from the networked computing environment;

updating a representation of a digital asset in a security database in response to determining that the digital asset information corresponds to a previously detected digital asset;

generating the representation of the digital asset in the security database in response to determining that the digital asset information corresponds to a new digital asset;

detecting a plurality of attribute values in the digital asset information;

determining that the digital asset information corresponds to the previously detected digital asset in response to determining that a portion of the plurality of attribute values match a stored portion of values of the previously detected digital asset; and evicting the representation of the digital asset from the security database, in response to determining that the digital asset information does not include attribute values matching stored attribute values of the digital asset.

2. The method of claim 1, further comprising:

detecting a hash of a digital certificate in the digital asset information; and determining that the digital asset information corresponds to the previously detected digital asset in response to determining that the detected hash matches a stored hash of the previously detected digital asset.

3. The method of claim 1, further comprising:

determining that an attribute value of the plurality of attribute values is a validated value in response to detecting the attribute value changes at a number of instances which exceed a predetermined threshold; and determining that the attribute value is an unvalidated value in response to detecting the attribute value changes being at a number of instances less than the predetermined threshold.

4. The method of claim 3, further comprising:

determining statistical distribution of the attribute value; and determining that the digital asset information corresponds to the previously detected digital asset in response to determining that the attribute value is an infrequent value based on the determined statistical distribution.

5. The method of claim 1, further comprising:

generating the representation of the digital asset based on the detected digital asset information.

6. The method of claim 5, wherein the detected digital asset information includes any one of: a network address, a subnet, an IP range, a communication port, a domain name, an operating system version, a hash of a certificate, an application version, a name from a namespace, a UUID, a MAC address, a known device identifier, a content, a website, a file, a filename, a network protocol banner, remote desktop address, a login page, and any combination thereof.

7. The method of claim 1, further comprising:

detecting a change in a domain name service (DNS) record associated with the networked computing environment; and replacing a stored network address in the representation of the digital asset with a network address corresponding to the changed DNS record.

8. The method of claim 1, wherein the digital asset is any one of: a virtual machine, a software container, a serverless function, a personal computing device, an IoT device, a physical computing device, a firewall, a hypervisor, a load balancer, a container, a pod, a database system, and any combination thereof.

9. The method of claim 1, further comprising:

receiving an identifier of an organization;

detecting in a DNS record a plurality of network addresses, wherein the DNS record is associated with the organization;

sending a network protocol message to a destination based on a network address of the plurality of network addresses; and receiving a reply to the network protocol message as part of the digital asset information.

10. A non-transitory computer-readable medium storing a set of instructions for detecting persistent digital assets in an attack surface of a networked computing environment, the set of instructions comprising:

one or more instructions that, when executed by one or more processors of a device, cause the device to:

continuously detect digital asset information over a network interface from the networked computing environment;

update a representation of a digital asset in a security database in response to determining that the digital asset information corresponds to a previously detected digital asset;

generate the representation of the digital asset in the security database in response to determining that the digital asset information corresponds to a new digital asset detect a plurality of attribute values in the digital asset information;

determine that the digital asset information corresponds to the previously detected digital asset in response to determining that a portion of the plurality of attribute values match a stored portion of values of the previously detected digital asset; and evict the representation of the digital asset, in response to determining that the digital asset information does not include attribute values matching stored attribute values of the digital asset.

11. A system for detecting persistent digital assets in an attack surface of a networked computing environment comprising:

a processing circuitry;

a memory, the memory containing instructions that, when executed by the processing circuitry, configure the system to:

continuously detect digital asset information over a network interface from the networked computing environment;

update a representation of a digital asset in a security database in response to determining that the digital asset information corresponds to a previously detected digital asset; and generate the representation of the digital asset in the security database in response to determining that the digital asset information corresponds to a new digital asset detect a plurality of attribute values in the digital asset information;

determine that the digital asset information corresponds to the previously detected digital asset in response to determining that a portion of the plurality of attribute values match a stored portion of values of the previously detected digital asset and;

evict the representation of the digital asset, in response to determining that the digital asset information does not include attribute values matching stored attribute values of the digital asset.

12. The system of claim 11, wherein the memory contains further instructions which when executed by the processing circuitry further configure the system to:

detect a hash of a digital certificate in the digital asset information; and determine that the digital asset information corresponds to the previously detected digital asset in response to determining that the detected hash matches a stored hash of the previously detected digital asset.

13. The system of claim 11, wherein the memory contains further instructions which when executed by the processing circuitry further configure the system to:

determine that an attribute value of the plurality of attribute values is a validated value in response to detecting the attribute value changes being a number of instances which exceed a predetermined threshold; and determine that the attribute value is an unvalidated value in response to detecting that the attribute value changes at a number of instances less than the predetermined threshold.

14. The system of claim 13, wherein the memory contains further instructions which when executed by the processing circuitry further configure the system to:

determine statistical distribution of the attribute value; and determine that the digital asset information corresponds to the previously detected digital asset in response to determining that the attribute value is an infrequent value based on the determined statistical distribution.

15. The system of claim 11, wherein the memory contains further instructions which when executed by the processing circuitry further configure the system to:

generate the representation of the digital asset based on the detected digital asset information.

16. The system of claim 15, wherein the detected digital asset information includes any one of: a network address, a subnet, an IP range, a communication port, a domain name, an operating system version, a hash of a certificate, an application version, a name from a namespace, a UUID, a MAC address, a known device identifier, a content, a website, a file, a filename, a network protocol banner, remote desktop address, a login page, and any combination thereof.

17. The system of claim 11, wherein the memory contains further instructions which when executed by the processing circuitry further configure the system to:

detect a change in a domain name service (DNS) record associated with the networked computing environment; and replace a stored network address in the representation of the digital asset with a network address corresponding to the changed DNS record.

18. The system of claim 11, wherein the digital asset is any one of:

a virtual machine, a software container, a serverless function, a personal computing device, an IoT device, a physical computing device, a firewall, a hypervisor, a load balancer, a container, a pod, a database system, and any combination thereof.

19. The system of claim 11, wherein the memory contains further instructions which when executed by the processing circuitry further configure the system to:

receive an identifier of an organization;

detect in a DNS record a plurality of network addresses, wherein the DNS record is associated with the organization;

send a network protocol message to a destination based on a network address of the plurality of network addresses; and receive a reply to the network protocol message as part of the digital asset information.

* * * * *